US010127482B2

(12) United States Patent
Takamoto

(10) Patent No.: US 10,127,482 B2
(45) Date of Patent: Nov. 13, 2018

(54) PRINTING SYSTEM INCLUDING AUTOMATIC STATUS TRANSMISSION FUNCTION AND CONTROL DEVICE AND CONTROL METHOD THEREOF

(71) Applicant: Seiko Epson Corporation, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/335,185

(22) Filed: Oct. 26, 2016

(65) Prior Publication Data

US 2017/0132500 A1 May 11, 2017

(30) Foreign Application Priority Data

Nov. 9, 2015 (JP) ................................. 2015-219615
Nov. 9, 2015 (JP) ................................. 2015-219618

(51) Int. Cl.
*G06K 15/02* (2006.01)
*H04L 29/08* (2006.01)
*H04L 29/06* (2006.01)

(52) U.S. Cl.
CPC ..... *G06K 15/1809* (2013.01); *G06K 15/1821* (2013.01); *H04L 67/34* (2013.01); *H04L 67/42* (2013.01); *G06K 2215/0011* (2013.01); *G06K 2215/0017* (2013.01)

(58) Field of Classification Search
None
See application file for complete search history.

(56) References Cited

U.S. PATENT DOCUMENTS

| 6,147,767 | A | * | 11/2000 | Petteruti | G06K 15/00 358/1.18 |
| 7,271,924 | B1 | * | 9/2007 | Takamizawa | G06F 3/121 358/1.1 |
| 7,574,545 | B2 | * | 8/2009 | Keeney | G06F 3/1207 358/1.15 |
| 2013/0128300 | A1 | | 5/2013 | Takamoto | |
| 2015/0036182 | A1 | | 2/2015 | Nakamura | |
| 2015/0170125 | A1 | | 6/2015 | Takamoto | |

FOREIGN PATENT DOCUMENTS

| JP | 10-333856 A | 12/1998 |
| JP | 2004-090443 A | 3/2004 |
| JP | 2004-129280 A | 4/2004 |
| JP | 2006-072525 A | 3/2006 |
| JP | 2012-181711 A | 9/2012 |
| JP | 2013-210886 A | 10/2013 |

* cited by examiner

*Primary Examiner* — Thomas D Lee
(74) *Attorney, Agent, or Firm* — Foley & Lardner LLP

(57) ABSTRACT

Functionality for issuing instructions related to the status of a printing device can be added to a control device capable of connecting to a printing device while suppressing modification of programs installed on the control device. A network system 1 includes a printer 9 that prints on recording media, and a control device 8 capable of communicating with the printer 9. The control device 8 has a control unit that generates and outputs by a printing program a command instructing the printer 9 to print; and a management unit that adds a maintenance command issuing an instruction related to the status of the printer 9 to the command output by the control unit, and sends the command with the added maintenance command to the printer 9, by a maintenance program that is different from the printing program.

8 Claims, 12 Drawing Sheets

RECEIPT PRODUCTION
INSTRUCTION COMMAND

PRINT INSTRUCTION COMMAND

PRINT INSTRUCTION COMMAND

⋮

PRINT INSTRUCTION COMMAND

CUT COMMAND

PRINTING SYSTEM INCLUDING AUTOMATIC STATUS TRANSMISSION FUNCTION AND CONTROL DEVICE AND CONTROL METHOD THEREOF

The present invention claims priority to Japanese Application Nos. 2015-219615 filed on Nov. 9, 2015 and 2015-219618 filed on Nov. 9, 2015, which are hereby incorporated by reference in their entirety.

BACKGROUND

1. Technical Field

The present invention relates to a printing system, a control device, and a control method of a printing system.

2. Related Art

Printing systems including a control device (host device) to which a printer driver or other printing program is installed and a processing device that connects to the control device, and configured such that the control device controls the printing device through functions of the printing program are known from the literature. See, for example, JP-A-2006-72525.

Adding functionality to the control device for issuing instructions related to the status of the printing device in such a printing system may be accomplished by modifying the printing program to add such functionality to the control device. However, the work required to modify the printing program is complex, and modifications of the printing program can adversely affect existing processes of the control device.

SUMMARY

The disclosure is directed to solving this problem, and an objective of the disclosure is to suppress modification of programs installed on a control device capable of connecting to a processing device while adding to the control device functionality for issuing instructions related to the status of the printing device.

Another objective is to add to the control device functionality for acquiring the status of the printing device.

Another objective is to provide a control device capable of communicating with a printing device having a function for automatically transmitting status-related information with the ability enable this function of the printing device.

A printing system according to one aspect of the disclosure includes a printing device (printer) that prints on recording media; and a control device (computer) capable of communicating with the printing device. The control device has a control unit (controller) configured to generate and output by a printing program a command instructing the printing device to print; and a management unit (manager) configured to add a maintenance command related to the status of the printing device to the command output by the control unit, and send the maintenance command with the command to the printing device, by a maintenance program that is different from the printing program.

Thus comprised, the control device can issue commands related to the status of the printer by a management unit based on maintenance program functions without modifying the printing program. More specifically, functionality for issuing commands related to the status of the printer can be added to a control device that can connect to the printer while suppressing modification of programs already installed on the control device.

In a printing system according to another aspect of the disclosure, the printing device has a cutter to cut the recording media; the command is a command set including a print instruction command instructing printing an image to the recording media, and a cut instruction command instructing cutting the recording media by the cutter after the print instruction command; and the management unit adds the maintenance command after the cut instruction command contained in the command.

By adding the maintenance command after the cut instruction command, this configuration prevents inserting the maintenance command, which is unrelated to producing a ticket, between one command and the command in the command, and prevents tickets from not being produced normally.

In a printing system according to another aspect of the disclosure, the maintenance command is a request command requesting the printing device to return status information related to the printing device.

The control device in this configuration can acquire the status of the printer by a management unit based on a maintenance program function without modifying the printing program. More specifically, functionality for acquiring the status of the printer can be added to a control device that can connect to the printer while suppressing modification of programs already installed on the control device.

In the printing system according to another aspect of the disclosure, the management unit of the control device determines if received data received from the printing device is the status information, outputs the received data to the control unit if the received data is not the status information, and if the received data is the status information, executes a process based on the status information and does not output the status information to the control unit.

Thus comprised, the management unit outputs data received from the printing device that should be processed by the control unit to the control unit for processing by the control unit. Data received from the printing device that should be processed by the management unit is not output to the control unit and is processed by the management unit.

In a printing system according to another aspect of the disclosure, the printing device has an automatic transmission function that monitors the status of specific log items related to the printing device, and transmits status information related to the log item of which the status changed without being requested by the control device if there is a change in the status of any log item. The automatic transmission function can be set to an enabled state or a disabled state; and the maintenance command is a command setting the automatic transmission function of the printing device to either the enabled or disabled state.

By the control unit adding and transmitting a command for enabling or disabling the automatic transmission function, the management unit based on a function of the maintenance program turns a function for automatically transmitting status information about the printer on or off. As a result, the control device can enable this function of the printing device by means of a management unit based on a maintenance program function without the printing program being modified.

In a printing system according to another aspect of the disclosure, the management unit of the control device determines if the received data received from the printing device is status information, outputs the received data to the control unit if the received data is not the status information, and outputs the status information to the control unit if the received data is the status information.

Thus comprised, the management unit outputs received data that was received from the printing device and should be processed by the control unit to the control unit, and the received data is processed by the control unit. If the received data received from the printing device is status information to be processed by the management unit, the management unit executes a process based on the status information and does not output the data to the control unit.

Another aspect of the disclosure is a control device capable of communicating with a printing device that prints on recording media, including: a control unit configured to generate and output by a printing program a command instructing the printing device to print; and a management unit configured to add a maintenance command related to the status of the printing device to the command output by the control unit, and send the maintenance command with the command to the printing device, by a maintenance program that is different from the printing program.

Thus comprised, the control device can acquire the status of the printing device by a management unit based on a maintenance program function without modifying the printing program. More specifically, functionality for acquiring the status of the printer can be added to a control device that can connect to the printer while suppressing modification of programs already installed on the control device.

In a control device according to another aspect of the disclosure, the printing device has a cutter to cut the recording media; the command is a command set including a print instruction command instructing printing an image to the recording media, and a cut instruction command instructing cutting the recording media by the cutter after the print instruction command; and the management unit adds the maintenance command after the cut instruction command contained in the command.

By adding the maintenance command after the cut instruction command, this configuration prevents inserting the maintenance command, which is unrelated to producing a ticket, between one command and the command in the command, and prevents tickets from not being produced normally.

In a control device according to another aspect of the disclosure, the maintenance command is a request command requesting the printing device to return status information related to the printing device.

In a control device according to another aspect of the disclosure, the management unit of the control device determines if received data received from the printing device is the status information, outputs the received data to the control unit if the received data is not the status information, and if the received data is the status information, executes a process based on the status information and does not output the status information to the control unit.

Thus comprised, the management unit outputs data received from the printing device that should be processed by the control unit to the control unit for processing by the control unit. Data received from the printing device that should be processed by the management unit is not output to the control unit and is processed by the management unit.

In another aspect of the disclosure, the printing device has an automatic transmission function that can be set to an enabled state or a disabled state, the automatic transmission function monitoring the status of specific log items related to the printing device, and transmitting status information related to the log item of which the status changed without being requested by the control device if there is a change in the status of any log item; the management unit adds to the command an enable command that sets the automatic transmission function f the printing device to the enabled state, and transmits the command with the added enable command the maintenance command being a command setting the automatic transmission function of the printing device to either the enabled or disabled state.

By the control unit adding and transmitting a command for enabling or disabling the automatic transmission function, the management unit based on a function of the maintenance program turns a function for automatically transmitting status information about the printer on or off. As a result, the control device can enable this function of the printing device by means of a management unit based on a maintenance program function without the printing program being modified.

In a control device according to another aspect of the disclosure, the management unit determines if the received data received from the printing device is status information, outputs the received data to the control unit if the received data is not the status information, and outputs the status information to the control unit if the received data is the status information.

Another aspect of the disclosure is a control method of a printing system including a printing device that prints on recording media, and a control device capable of communicating with the printing device, the control method including steps of: the control device generating and outputting by a printing program a command instructing the printing device to print; and the control device adding a maintenance command related to the status of the printing device to the command output by the control unit, and sending the maintenance command with the command to the printing device, by a maintenance program that is different from the printing program.

Thus comprised, the control device can issue commands related to the status of the printer by a management unit based on maintenance program functions without modifying the printing program. More specifically, functionality for issuing commands related to the status of the printer can be added to a control device that can connect to the printer while suppressing modification of programs already installed on the control device.

In the control method of a printing system according to another aspect of the disclosure, a step of adding the status response request command after the cut instruction command contained in the command when adding the maintenance command to the command; the printing device has a cutter to cut the recording media; the command is a command set including a print instruction command instructing printing an image to the recording media, and a cut instruction command instructing cutting the recording media by the cutter after the print instruction command; and the maintenance command is added after the cut instruction command contained in the command.

By adding the maintenance command after the cut instruction command, this configuration prevents inserting the maintenance command, which is unrelated to producing a ticket, between one command and the command in the command, and prevents tickets from not being produced normally.

Other objects and attainments together with a fuller understanding of the disclosure will become apparent and appreciated by referring to the following description and claims taken in conjunction with the accompanying drawings.

DESCRIPTION OF EMBODIMENTS

Embodiment 1

A first embodiment of the disclosure is described below with reference to the accompanying figures. A status response request command (request command) is added to the commands as a maintenance command in this first embodiment of the disclosure. A status response request command is a command requesting the return of information related to the status of the printer 9.

Figure 1:
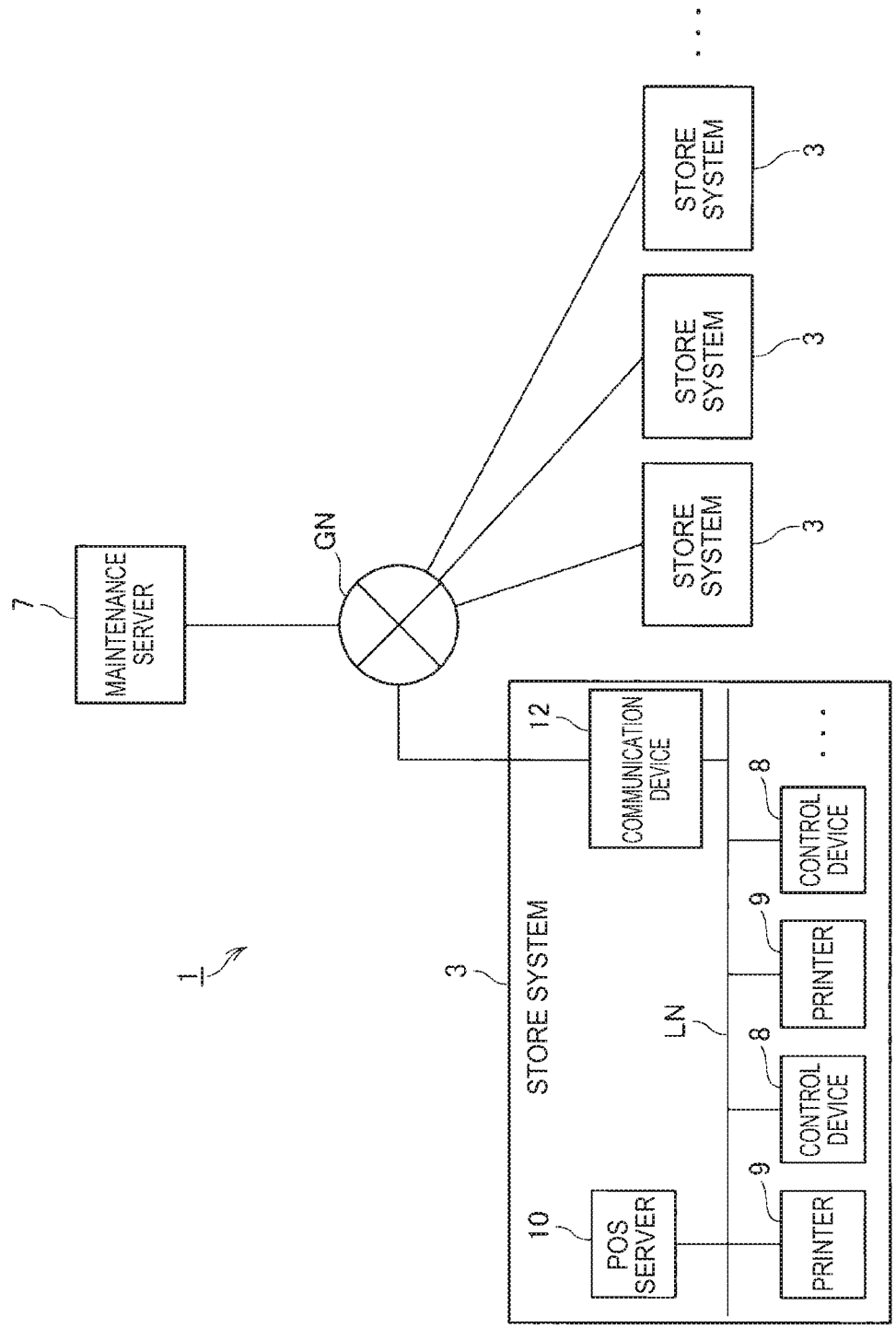
FIG. 1 illustrates a printing system according to a preferred embodiment of the disclosure.

FIG. 1 illustrates the configuration of network system (printing system) network system 1 according to this embodiment. The network system 1 is a system used by a company that manages stores, such as supermarkets, convenience stores, department stores, or restaurants, that provide products or services and process transactions according to the provided product or service.

As shown in FIG. 1, the network system 1 includes multiple store systems store system 3 and a maintenance server 7.

The store system 3 is a system used in a store.

As shown in FIG. 1, the store system 3 has a local area network LN. One or more control devices (computer) 8, a printer (printing device) 9 connected to each control device 8, and a POS server 10 connect to the local area network LN.

The communication protocol used for communication over the local area network LN may be any desirable protocol, and communication through the local area network LN may be by wired communication or wireless communication.

The printer 9 is a device with a printing function. The printer 9 is disposed together with the control device 8 that controls the printer 9 at a checkout counter where customers complete transactions in the store. In other words, both a printer 9 and a control device 8 are installed at each checkout counter.

The control device 8 is a device that communicates with the printer 9 and controls the printer 9. As described further below, the control device 8 acquires required information from the POS server 10 and executes a transaction process when a sale transaction is processed in the store system 3, and controls the printer 9 to produce a receipt (ticket) based on the transaction process. The receipt produced by the printer 9 is then given by the checkout clerk to the customer.

As described below, the control device 8 has a function for acquiring from the printer 9 information (status information) related to the status of the printer 9, and reporting to the maintenance server 7. The POS server 10 is a server configured to store information required by the control device 8 to execute the transaction process.

The configuration, functions, and processes based on those functions of the control device 8, printer 9, and POS server 10 are described further below.

The communication device 12 is an interface device that connects a local area network LN to a global network GN. The communication device 12 functions as a modem (or ONU (Optical Network Unit)), a router, a NAT (Network Address Translation) function, and a DHCP (Dynamic Host Configuration Protocol) server.

The communication device 12 relays data that is sent and received between devices when a device connected to a local area network and a device connected to the global network GN communicate. Note that in FIG. 1 the communication device 12 is represented by a single block, but the communication device 12 may comprise multiple devices with specific functions.

The control device 8, printer 9, and POS server 10 of the store system 3 can communicate through the local area network LN.

The printer 9 of the store system 3 uses functions of the communication device 12 to communicate with the maintenance server 7 through the local area network LN and global network GN.

Note that the store system 3 is part of the network system 1, and is an example of a printing system including a printer 9 and a control device 8 capable of communicating with the printer 9.

The maintenance server 7 is a server that manages the status of printers 9 in the store system 3. The maintenance server 7 is described further below.

Note that in FIG. 1 the maintenance server 7 and POS server 10 are represented by single function blocks, but this does not mean each of the servers is configured from a single server device. For example, the maintenance server 7 and POS server 10 may be configured to include multiple server devices.

Communication between the maintenance server 7 and printer 9 is made secure by using a virtual private network (VPN) or other type of encryption technology or virtual dedicated line (or dedicated physical line) technology.

Figure 2:
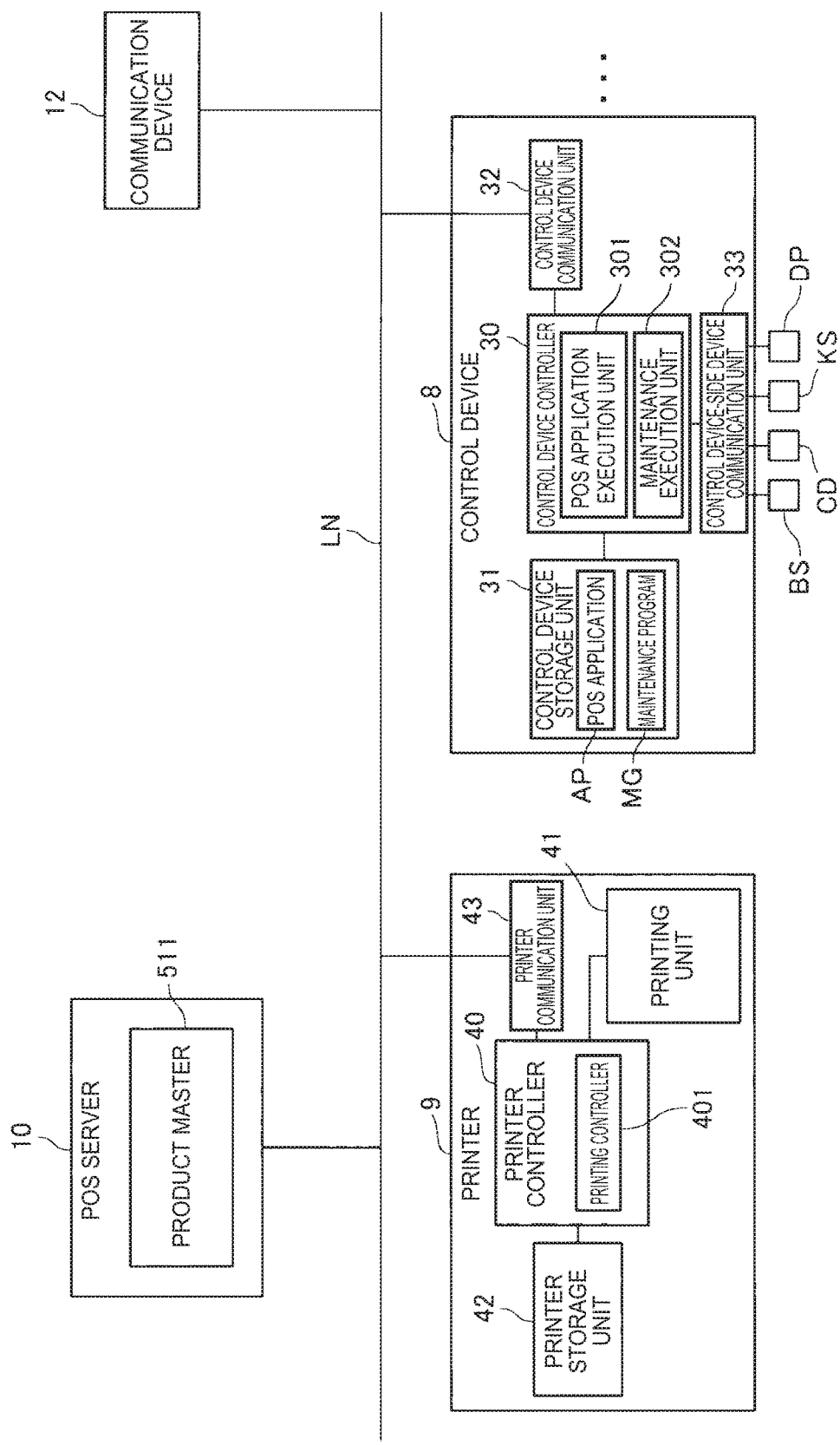
FIG. 2 illustrates the printing system.

As shown in FIG. 2 is a block diagram illustrating the functional configuration of the control device 8, printer 9, and POS server 10 in the store system 3.

The control device 8 is a host computer that controls the printer 9. More specifically, the control device 8 executes a transaction process based on the transaction performed at the checkout counter, controls the printer 9 based on the transaction process, and causes the printer 9 to produce a receipt.

As shown in FIG. 2, the control device 8 has a control device controller 30, control device storage unit (control device storage) 31, control device communication unit (control device communicator) 32, and control device-side device communication unit (control device-side device communicator) 33.

The control device controller 30 has CPU, ROM, RAM, and other peripheral circuits not shown, and controls the control device 8. A CPU reads the program and data in the control device storage unit 31 and executes. A POS application AP (printing program) for executing a sale transaction process, sending commands to the printer 9 based on the transaction process, and controlling the printer 9 is installed on the control device 8. A maintenance program MG that causes the maintenance execution unit 302 (described below) to execute the processes described below is also installed to the control device 8.

The POS application execution unit 301 (control unit, controller) of the control device controller 30 executes processes by reading and running the installed POS application AP.

The maintenance execution unit 302 (management unit, manager) of the control device controller 30 executes processes by reading and running the installed maintenance program MG.

The control device storage unit 31 has nonvolatile memory and stores data.

The control device communication unit 32 communicates with devices (other control devices 8, printers 9, POS server 10, and communication device 12) connected to the local area network LN through the local area network LN according to a specific communication protocol.

The control device communication unit 32 controls the communication device 12 as controlled by the control device controller 30 to communicate according to a specific communication protocol through the local area network LN and global network GN with other devices connected to the global network GN (including the maintenance server 7).

The control device-side device communication unit 33 has an interface board with a USB port, a port conforming to a non-USB serial communication standard, or a port conforming to another communication protocol. The control device-side device communication unit 33 communicates with devices connected to the interface board as controlled by the control device controller 30. Note that the control device-side device communication unit 33 may have a wireless communication capability and be configured to communicate with devices wirelessly.

In the example shown in FIG. 2, a barcode scanner BS, customer display CD, cash drawer KS, and display DP connect as peripheral devices to the control device 8.

The barcode scanner BS reads barcodes from products and product packaging, and outputs data representing the read result to the control device-side device communication unit 33. The control device-side device communication unit 33 outputs the data input from the barcode scanner BS to the control device controller 30.

The customer display CD is an LCD display or other type of display device, and displays information as controlled by the control device controller 30. Information displayed on the customer display CD can be seen by the customer in the transaction at the checkout counter.

The cash drawer KS has a tray for holding money, mechanisms for locking and unlocking the tray, and a mechanism for kicking out the tray, and releases the lock and kicks out the tray as controlled by the control device controller 30.

The display DP is an LCD display or other type of display device, and displays information as controlled by the control device controller 30. Information presented on the display DP can be seen by the checkout clerk operating the register at the checkout counter.

The printer 9 is a thermal line printer that stores continuous roll paper (recording media) and prints images by forming dots on the roll paper with a thermal line head.

As shown in FIG. 2, the printer 9 has a printer controller 40, printing unit (printing mechanism) 41, printer storage unit (printer storage) 42, and printer communication unit (printer communicator) 43.

The printer controller 40 comprises a CPU, ROM, RAM, and other peripheral circuits not shown and controls the printer 9. A CPU reads the program (firm ware) and data in the printer storage unit 42 and executes.

The printer controller 40 includes a printing controller 401. The printing controller 401 executes processes by the cooperation of hardware and software, such as a CPU reading and running firmware or other program. The printing controller 401 is described further below.

In addition to a mechanism for conveying roll paper stored inside the cabinet of the printer 9, the printing unit 41 has a print mechanism with a printhead for printing images on the roll paper, and a cutter mechanism including a cutter for cutting the roll paper. The printing unit 41 produces receipts as controlled by the printer controller 40 by conveying the roll paper by the conveyance mechanism, printing receipt images on the roll paper by the print mechanism, and then cutting the roll paper by the cutter mechanism at a specific position.

The printer storage unit 42 has nonvolatile memory and stores data.

The printer communication unit 43 accesses the local area network LN and communicates as controlled by the printer controller 40 with devices (including the control device 8 and POS server 10) connected to the local area network LN.

As shown in FIG. 2 the POS server 10 stores a product master 511. The product master 511 is a database relationally storing product code, price, and other information about products sold in the store.

The operation of the control device 8 and printer 9 when processing a transaction at a checkout counter in a store is described next.

Figure 3:
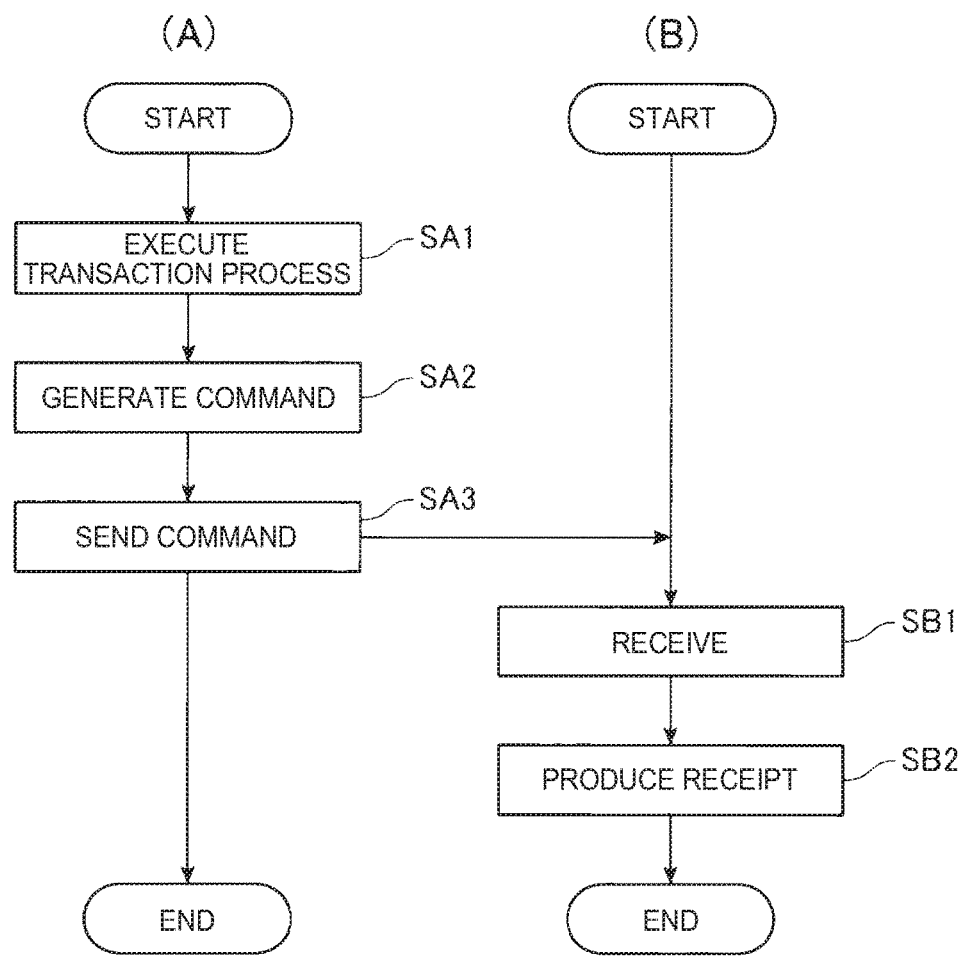
FIG. 3 is a flow chart of the operation of the control device and printing device.

FIG. 3 is a flowchart showing the operation of the control device 8 and printer 9 during a transaction process, (A) showing the operation of the control device 8 and (B) showing the operation of the printer 9.

Note that for brevity in the following description referring to FIG. 3, an status response request command (maintenance command) as described below is not added to the commands generated by the POS application execution unit 301 of the control device 8.

As shown in FIG. 3 (A), the POS application execution unit 301 of the control device 8 executes a transaction process according to the customer transaction (step SA1).

In the transaction process, the checkout clerk reads the barcode of a product purchased by the customer with the barcode scanner BS. Based on the read result from the barcode scanner BS, the POS application execution unit 301 acquires the product code of the product, references the product master 511 of the POS server 10, and acquires the product price and other product-related information required by the transaction process. Based on the acquired product-related information, the POS application execution unit 301 displays product-related information on the customer display CD and display DP. Based on the acquired product-related information, the control device controller 30 also calculates the transaction amount and change due, confirms the transaction, displays information indicating the calculated amounts on the customer display CD and display DP, and controls the cash drawer KS.

After executing the transaction process in step SA1, the POS application execution unit 301 generates control commands causing the printer 9 to produce a receipt printed with transaction-related information (such as product-related information, information about the transaction total, and information about the change due) based on the transaction process (step SA2).

Next, the POS application execution unit 301 controls the control device communication unit 32 to send the generated control commands to the printer 9 (step SA3).

As shown in FIG. 3 (B), the printing controller 401 of the printer 9 controls the printer communication unit 43 to receive the commands (step SB1).

Next, the printing controller 401 controls the printing unit 41 to produce a receipt based on the received commands (step SB2).

The receipt is then given by the checkout clerk to the customer.

Operation of the printer 9, control device 8, and maintenance server 7 when managing the status of the printer 9 by the maintenance server 7 as part of the control method of the network system 1 according to the disclosure is described next.

Figure 4:
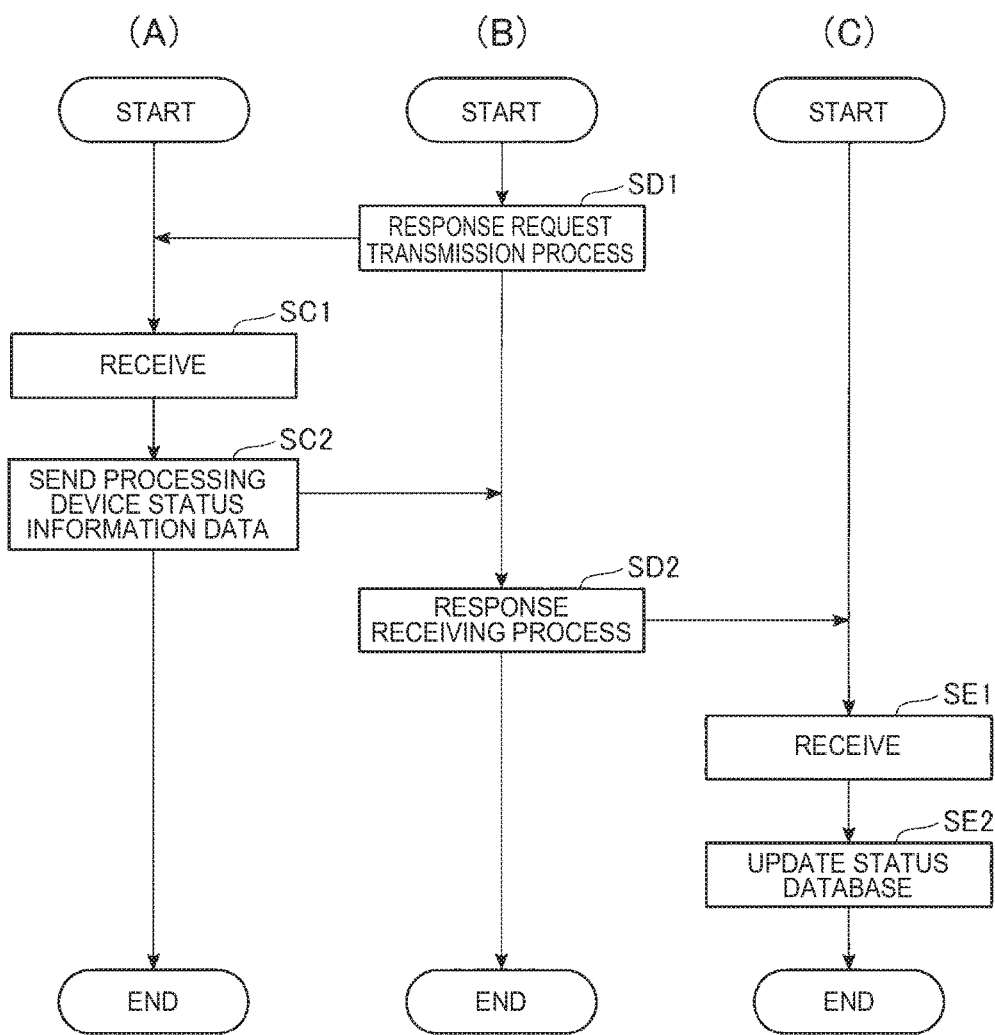
FIG. 4 is a flow chart of the operation of the printing device, control device, and maintenance server.

FIG. 4 is a flowchart of the operation of the printer 9, control device 8, and maintenance server 7, (A) showing the operation of the printer 9, (B) showing the operation of the control device 8, and (C) showing the operation of the maintenance server 7.

As shown in FIG. 4 (B), the control device controller 30 of the control device 8 executes a response request transmission process (step SD1).

The response request transmission process is a process of sending to the printer 9 a status response request command requesting the printer 9 to return processing device status information data (described further below) containing information related to the state of the printer 9. The response request transmission process of step SD1 is described further below.

Figure 5:
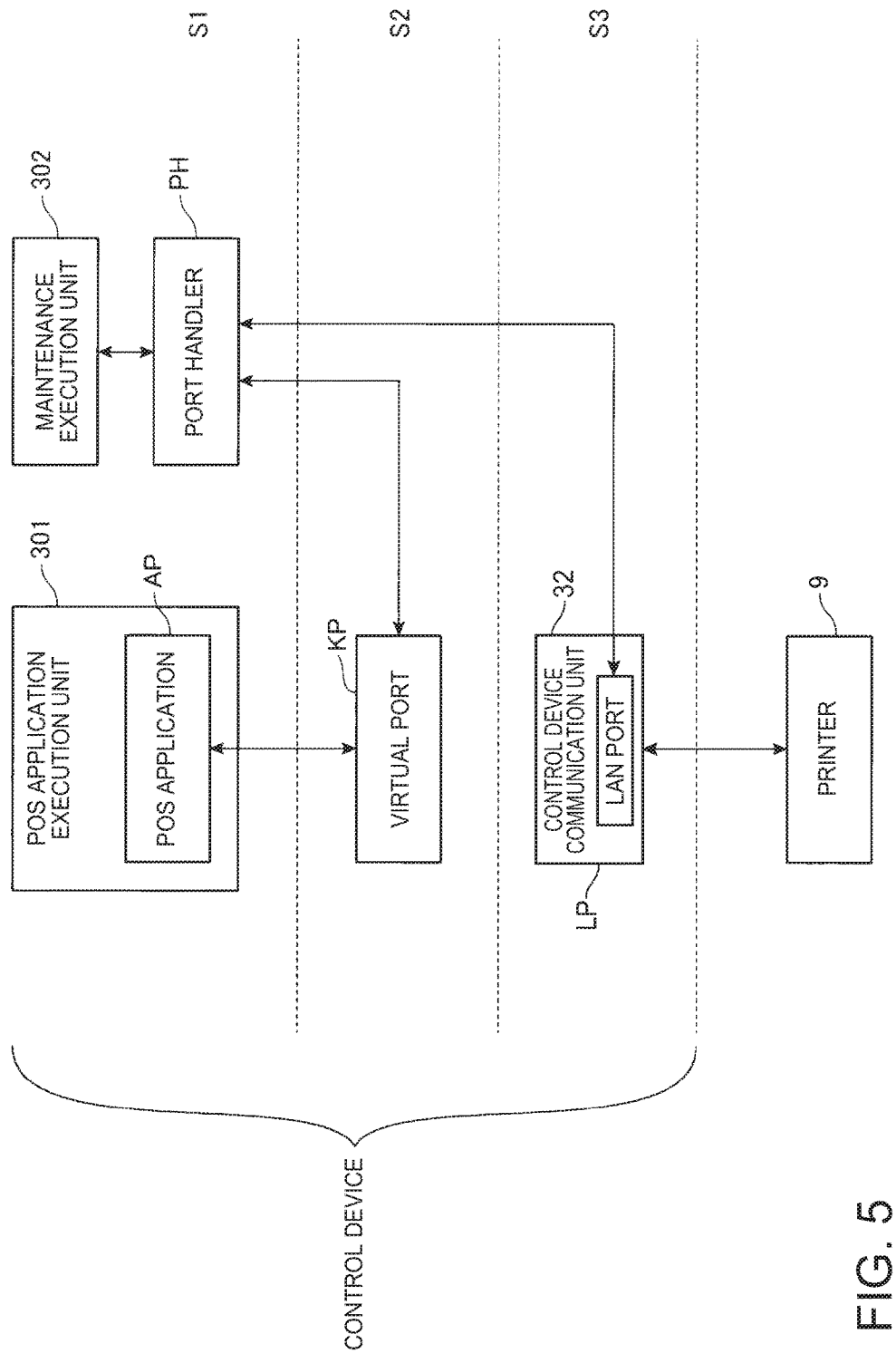
FIG. 5 illustrates main parts of the control device.

FIG. 5 illustrates main parts of the control device 8 in a format convenient for description.

For brevity in FIG. 5, the function blocks, programs, logical (software) ports, and physical devices are all represented by equivalent blocks.

In FIG. 5, reference numeral S1 indicates the application layer in a hierarchical operating system, S2 indicates the kernel layer, and S3 indicates the physical device layer.

In FIG. 5 the virtual port KP is a software (logical) port instantiated as an interface through which the POS application execution unit 301 outputs data and data is input to the POS application execution unit 301. To output data, the POS application execution unit 301 outputs to the virtual port KP. Data is also output to the POS application execution unit 301 from the virtual port KP.

In FIG. 5 the LAN port LP is a communication port disposed to a communication interface compatible with the specific communication protocol used on the local area network LN (LAN). A LAN cable connects to the LAN port LP, and the control device 8 communicates with the local area network LN through the LAN cable connected to the LAN port LP.

The port handler PH in FIG. 5 is a function block that relays data transmissions between the virtual port KP and LAN port LP, and includes at least the following functions.

The port handler PH has a function for outputting to the maintenance execution unit 302 commands the POS application execution unit 301 output to the virtual port KP.

The port handler PH also has a function for outputting data input through the LAN port LP to the maintenance execution unit 302.

The port handler PH also has a function for outputting to the LAN port LP data addressed to the LAN port LP that the maintenance execution unit 302 output to the port handler PH. The port handler PH also has a function for outputting to the virtual port KP data addressed to the virtual port KP that the maintenance execution unit 302 output to the port handler PH. When outputting data to the LAN port LP or virtual port KP, the port handler PH uses a function of a Port Communication Service (PCS) to convert the data according to the standard of the interface used by the corresponding port.

As shown in FIG. 5, the POS application execution unit 301, maintenance execution unit 302, and port handler PH are on the application layer S1. The virtual port KP is on the kernel layer S2. The LAN port LP is on the physical device layer S3.

Figure 6:
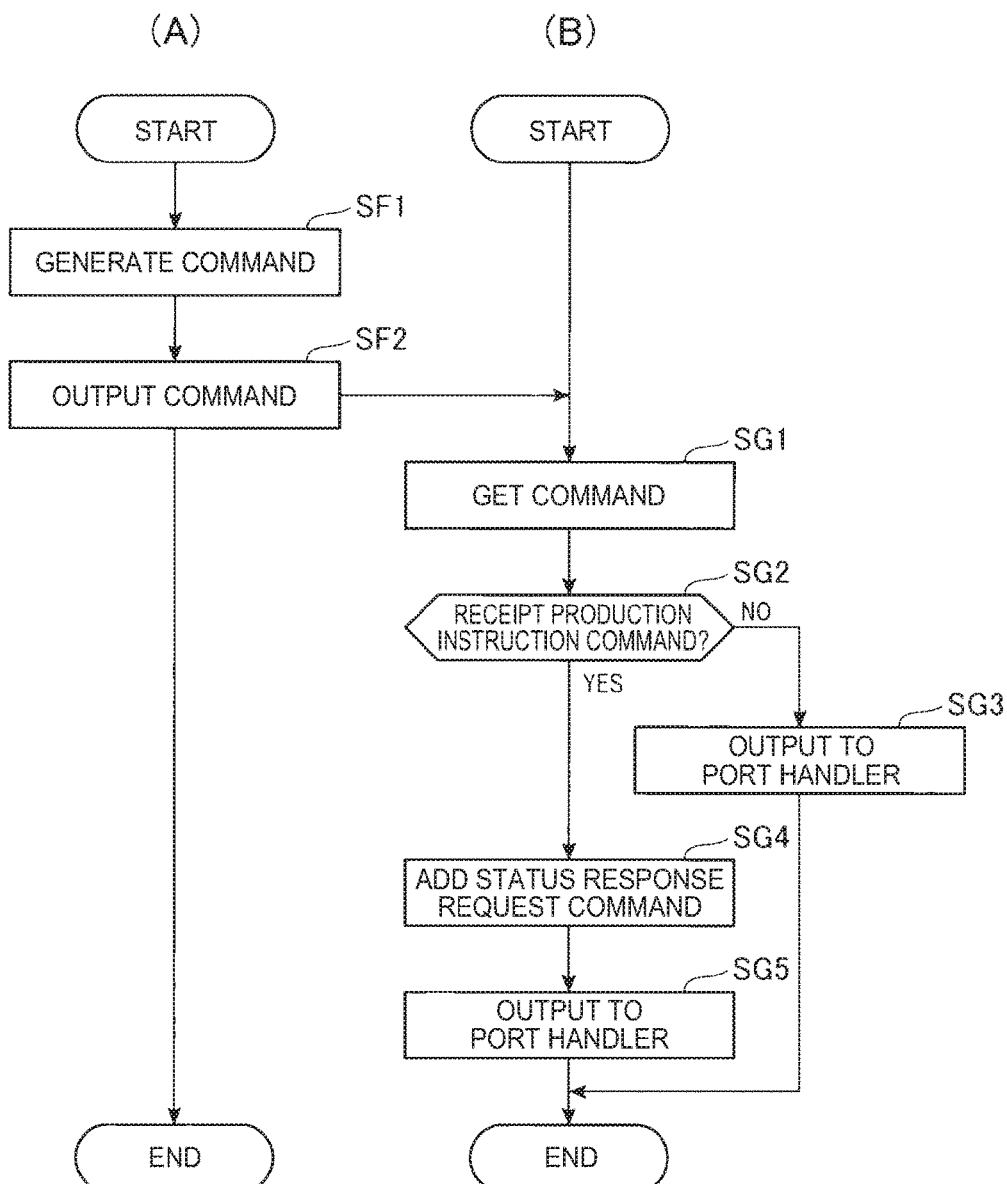
FIG. 6 is a flow chart of the operation of the control device.

FIG. 6 is a flow chart of the operation of the POS application execution unit 301 and maintenance execution unit 302 when executing the response request transmission process of step SD1 in FIG. 4. FIG. 6 (A) shows the operation of the POS application execution unit 301, and (B) shows the operation of the maintenance execution unit 302.

As will be understood from FIG. 6, the control device 8 sends a status response request command to the printer 9 when transmitting commands for producing a receipt to the printer 9.

As shown in FIG. 6 (A), when a transaction is processed at the checkout counter, the POS application execution unit 301 executes the transaction process and generates a command instructing producing a receipt (step SF1) as described in the flow chart in FIG. 3 (A).

Of the commands generated by the POS application execution unit 301, the command instructing producing a receipt is referred to below as a receipt production instruction command.

Note that the POS application AP in this embodiment also functions as a printer driver, and the POS application execution unit 301 generates commands. However, a printer driver separate from the POS application AP may be installed on the control device 8, and the POS application AP and printer driver may work together to generate commands.

The POS application execution unit 301 outputs the generated commands to the virtual port KP (step SF2).

The command (receipt production instruction command in this example) output to the virtual port KP is output by a function of the port handler PH to the maintenance execution unit 302.

As shown in FIG. 6 (B), the maintenance execution unit 302 acquires the command the POS application execution unit 301 output (step SG1).

Next, the maintenance execution unit 302 determines if the command acquired in step SG1 is a receipt production instruction command (step SG2). The command generated and output by the POS application execution unit 301 may not be a receipt production instruction command. Commands other than the receipt production instruction command include commands instructing the printer 9 to change a particular setting. In other words, the command acquired in step SG1 by the maintenance execution unit 302 is not necessarily a receipt production instruction command, and the process of step SG2 is therefore required.

Figure 7:
FIG. 7 shows an example of a receipt production command.

FIG. 7 illustrates the content of a receipt production instruction command. The content of a receipt production instruction command is simplified in FIG. 7 for brevity.

A receipt production instruction command is a command set comprising multiple commands.

As shown in FIG. 7, a receipt production instruction command may contain one or more print instruction commands. A print instruction command is a command instructing printing the images to be printed (logo, transaction-related information, other strings) on the receipt. The printer 9 prints images to the roll paper by sequentially executing the print instruction commands contained in the receipt production instruction command.

As also shown in FIG. 7, a receipt production instruction command includes at the end of the command set (after the printing instructions) a cut instruction command instructing cutting the roll paper. After printing the images, the printer 9 cuts the roll paper based on the cut instruction command, thereby separating the portion corresponding to the receipt from the paper roll and issuing a receipt.

The cut instruction command is therefore at the end of the command set in the receipt production instruction command. This is because cutting the roll paper is the last step in the series of steps whereby the printer 9 produces a receipt.

As shown in FIG. 6 (B), in step SG2 the maintenance execution unit 302 interprets the command acquired in step SG1, and determines if the command is a receipt production instruction command. The maintenance execution unit 302 can determine if the command acquired in step SG1 is a receipt production instruction command by determining if a print instruction command for printing a specific string that is always printed on a receipt (for example, whether or not the string TOTAL is contained if the string TOTAL is printed on every receipt) is contained in the set of commands in the receipt production instruction command. The process of step SG2 may be executed using any appropriate method.

If the command acquired in step SG1 is not a receipt production instruction command (step SG2: NO), the maintenance execution unit 302 outputs the command to the port handler PH (step SG3). The command output to the port handler PH is transmitted through the LAN port LP to the printer 9 by a function of the port handler PH.

If the command acquired in step SG1 is a receipt production instruction command (step SG2: YES), the maintenance execution unit 302 adds a status response request command after the cut instruction command (step SG4). As described above, the status response request command is a command requesting the printer 9 to return processing device status information data (described below) containing information related to the status of the printer 9.

Next, the maintenance execution unit 302 outputs a receipt production instruction command to which a status response request command was added (referred to below as a "modified command") to the port handler PH (step SG5). The command output to the port handler PH is transmitted by a function of the port handler PH to the printer 9 through the LAN port LP. The process of step SG5 is an example of a process of sending a command with an added status response request command to the printer 9.

The effect of the response request transmission process shown in FIG. 6 sending a status response request command from the control device 8 to the printer 9 is described below.

Specifically, there is no need to instantiate another communication path (such as a TCP connection between the maintenance execution unit 302 and printing controller 401 through the local area network LN) for the maintenance execution unit 302 to send the status response request command to the printer 9. The maintenance execution unit 302 can send the status response request command using the communication path the POS application execution unit 301 uses to exchange data with the printing controller 401 of the printer 9 without instantiating a new communication connection. This is particularly effective when there is only one logical port (such as a TCP port) that can be used for communication with the printing controller 401. This is because when a communication connection is opened with the printing controller 401 of the printer 9, the POS application execution unit 301 can use that communication connect to send the status response request command without closing the communication connection already open.

Because a status response request command is sent from the control device 8 to the printer 9 by executing the response request transmission process shown in FIG. 6, a status response request command can be transmitted to the printer 9 without modifying the POS application AP.

More specifically, as described in FIG. 6, the command (receipt production instruction command) the POS application execution unit 301 outputs is not changed in any way to transmit a status response request command. This is because the status response request command is added by a function of the maintenance execution unit 302 without affecting the process of the POS application execution unit 301. In other words, there is no need to change the content of commands output by the POS application execution unit 301 to transmit a status response request command, and modifying the POS application AP is therefore not necessary.

The status response request command is added after the cut instruction command. This is because commands contained in the receipt production instruction command are a series of commands related to producing a receipt, and a receipt can normally be produced by sequentially executing the commands in the order they are contained in the receipt production instruction command. Because the cut instruction command is the last command listed in the receipt production instruction command, adding the status response request command after the cut instruction command prevents the status response request command, which is unrelated to producing a receipt, from being inserted between one command and another command in the receipt production instruction command, and prevents the receipt from not being produced normally.

The reason the command to which the status response request command is added is the receipt production instruction command is because the receipt production instruction command always contains a cut instruction command, but commands other than the receipt production instruction command do not always contains a cut instruction command.

As shown in FIG. 4 (B), the modified command (receipt production instruction command to which a status response request command was added) is sent from the control device 8 to the printer 9 by the response request transmission process of step SD1.

Note that a configuration that adds the status response request command to the receipt production instruction command each time the POS application execution unit 301 generates a receipt production instruction command, and a configuration that adds the status response request command at a specific time when a previously set condition is met, are conceivable.

As shown in FIG. 4 (A), the printing controller 401 of the printer 9 receives the modified command (step SC1).

While not shown in FIG. 4, the printing controller 401 produces a receipt based on the receipt production instruction command contained in the modified command that is received.

Based on the status response request command contained in the modified command, the printing controller 401 generates and sends (returns) processing device status information data to the control device 8 (step SC2).

The processing device status information data is data including printer identification information identifying the printer 9, and a log of previously defined log items.

A log item stores information about a state that is monitored for changes, and is previously defined as a log item to be monitored and recorded (logged). Examples of log items in this embodiment of the disclosure include whether or not a printing-related error occurred, whether or not a communication-related error occurred, how many more days the printhead can be used, and how many more days the cutter can be used.

The log of information about each log item contained in the processing device status information data is referred to below as as log item log information.

The processing device status information data is an example of response data to the status response request command.

As shown in FIG. 4 (B), the control device controller 30 of the control device 8 executes a response receiving process to receive the data transmitted by the printer 9 (step SD2).

The response receiving process of step SD2 is described below.

Figure 8:
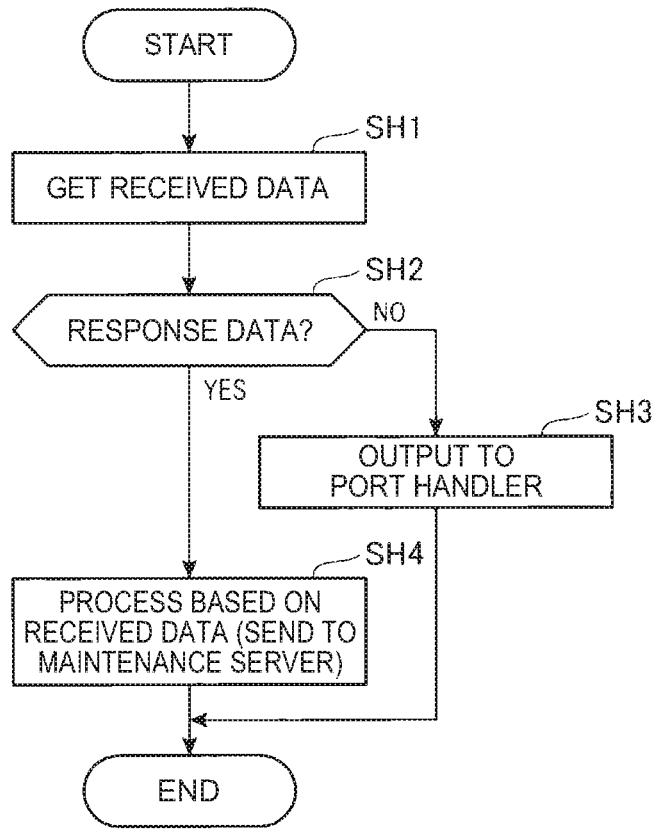
FIG. 8 is a flow chart of the operation of the control device.

FIG. 8 is a flowchart of the operation of the maintenance execution unit 302 when executing the response receiving process of FIG. 4 (B).

The data transmitted by the control device 8 is output through the LAN port LP to the port handler PH, and output by a function of the port handler PH to the maintenance execution unit 302. Below, the data the control device 8 receives from the printer 9 (the data output from the port handler PH to the maintenance execution unit 302) is referred to as the received data.

As shown in FIG. 8, the maintenance execution unit 302 acquires the received data output by the port handler PH (step SH1).

Next, the maintenance execution unit 302 analyzes the received data acquired in step SH1, and determines if the received data is data responding to the status response request command sent by the response request transmission process in step SD1 (that is, is the processing device status information data) (step SH2).

The data format of the data (processing device status information data) responding to the status response request command is defined, and the maintenance execution unit 302 makes the decision in step SH2 based on the format of the received data. Note that any appropriate method may be used to determine if the received data is data (processing device status information data) responding to the status response request command transmitted in the response request transmission process of step SD1.

When the received data acquired in step SH1 is not data (processing device status information data) responding to the status response request command (step SH2: NO), the maintenance execution unit 302 outputs the received data to the port handler PH (step SH3). The received data input to the port handler PH is then output by a function of the port handler PH to the POS application execution unit 301.

The process of step SH3 is an example of a process that outputs the received data to the POS application execution unit 301 (control unit) when the received data is not data responding to a status response request command.

The maintenance execution unit 302 thus outputs the received data to the POS application execution unit 301 when the received data is not data (processing device status information data) responding to the status response request command. This is because in this case the received data is data that the printer 9 transmitted for processing by the POS application execution unit 301.

If the received data acquired in step SH1 is data (processing device status information data) responding to the status response request command (step SH2: YES), the maintenance execution unit 302 executes a process based on the received data (=processing device status information data) without outputting the received data to the port handler PH (step SH4). More specifically, the maintenance execution unit 302 sends the processing device status information data to the maintenance server 7.

The process of step SH4 is an example of executing a process based on the received data without outputting the received data to the POS application execution unit 301 (control unit) when the received data is data responding to a status response request command.

As a result, when the received data is data responding to a status response request command, the maintenance execution unit 302 executes a process based on the received data instead of outputting the received data to the POS application execution unit 301. As a result, unexpected data being input to the POS application execution unit 301 and affecting processing by the POS application execution unit 301 can be prevented.

Note that the flow chart shown in FIG. 4 assumes that the received data was data (processing device status information data) responding to a status response request command.

As shown in FIG. 4 (C), the maintenance server 7 receives the processing device status information data transmitted by the control device 8 (step SE1).

Next, the maintenance server 7 updates the status database (not shown in the figure) based on the processing device status information data that was received (step SE2).

The status database is a database for storing printer identification information identifying the printer 9 and log item log information for each printer 9 in the store system 3.

Based on the processing device status information data that was received, in step SE2 the maintenance server 7 updates the corresponding log item log information stored in the status database.

For each printer 9 in the store system 3, the status database thus stores printer identification information identifying a specific printer 9 and the most recent log item log information for each printer 9.

When queried about the status of a particular printer 9, the maintenance server 7 references the status database and acquires the log item log information for that specific printer 9. Next, the maintenance server 7 returns information related to the state of the specific printer 9 based on the acquired log item log information.

As described above, a store system 3 included in a network system 1 according to this embodiment of the disclosure comprises a printer 9 that print to roll paper (recording media), and a control device 8 that can communicate with the printer 9. The control device 8 has a POS application execution unit (control unit) that generates and outputs commands instructing printing to the printer 9 according to a POS application AP (printing program). The control device 8 also has a maintenance execution unit 302 (management unit) that adds to the command output by the POS application execution unit 301 a status response request command requesting a response of information related to the status of a printer 9, and sends the modified command with the added status response request command to the printer 9, by means of a maintenance program MG that is different from the POS application AP.

Thus comprised, the control device 8 can acquire the status of the printer 9 through a maintenance execution unit 302 based on a function of the maintenance program MG without needing to modify the POS application AP. More specifically, functionality for acquiring the status of a printer 9 can be added to a control device 8 capable of connecting to the printer 9 while suppressing modification of programs installed on the control device 8.

Note that a program equivalent to a printing program is not limited to a POS application AP. For example, the program may be a combination of the POS application AP and a printer driver, or another program. In other words, the printing program may be any program different from the maintenance program MG.

In this embodiment of the disclosure the maintenance execution unit 302 of the control device 8 acquires and interprets data received from the printer 9, and determines if the received data is data of a response to a status response request command. If the received data is not data of a response to a status response request command, the maintenance execution unit 302 outputs the received data to the POS application execution unit 301; if the received data is data of a response to a status response request command, the maintenance execution unit 302 executes a process based on the received data instead of outputting the received data to the POS application execution unit 301.

Thus comprised, the maintenance execution unit 302 can output data received from the printer 9 that should be processed by the POS application execution unit 301 to the POS application execution unit 301, and the data can be processed by the POS application execution unit 301. The maintenance execution unit 302 also processes data received from the printer 9 for processing by the maintenance execution unit 302 instead of outputting the data to the POS application execution unit 301.

The command output by the POS application execution unit 301 in this embodiment of the disclosure is a command set instructing the printer 9 to produce a receipt (ticket), includes print instruction commands instructing printing images on roll paper, and a cut instruction command instructing cutting the roll paper at the end of the command set. When a status response request command is added to the command, the maintenance execution unit 302 adds the status response request command after the cut instruction command contained in the command.

By inserting the status response request command after the cut instruction command, this configuration can prevent the status response request command from being inserted between one command and another command in the receipt production instruction commands, and can prevent a receipt from not being produced normally.

Embodiment 2

A second embodiment of the disclosure is described next. In this second embodiment of the disclosure the printer 9 has an automatic status transmission function (automatic transmission function) for monitoring the status of log items, and when the status of any log item changes, automatically transmits status data including information related to the log item of which the status changed. A log item is an item previously defined for status monitoring by the printing controller 401 of the printer 9. An enable command is added as a maintenance command to the command. The enable command is a command enabling (turning on) the automatic status transmission function of the printer 9.

More specifically, the configuration of the network system 1, the configuration of the store system 3, the configuration of the control device 8, the configuration of the printer 9, and the operation shown in FIG. 3 are the same in this second embodiment as in the first embodiment.

The automatic status transmission function of the printer 9 is described below.

Log items in this embodiment include at least a log item related to printhead errors (referred to below as "printhead log items"); a log item related to errors in the cutter mechanism (referred to below as "cutter mechanism log items"); and a log item related to no-paper errors (referred to below as "no-paper log items").

Note that the log items described below are examples only, and there may be other log items.

When the automatic status transmission function is enabled, the printing controller 401 of the printer 9 monitors the status of the log items, and monitors for a change in status.

For printhead log items, the printing controller 401 monitors the status of errors with the printhead based on input from sensors not shown, for example, and detects a change from no error to detection of an error, and from detection of an error to no error (the error being resolved).

For cutter mechanism log items, the printing controller 401 monitors the status of errors with the cutter mechanism based on input from sensors not shown, for example, and detects a change from no error to detection of an error, and from detection of an error to no error (the error being resolved).

For no-paper log items, the printing controller 401 monitors for a change from the paper roll having paper to the paper roll decreasing to a no-paper state, and from detection of a no-paper state to the no-paper state being resolved.

If a change in the status of any log item is detected, the printing controller 401 generates status data (status information) including information related to the current status of the log item.

Figure 9:
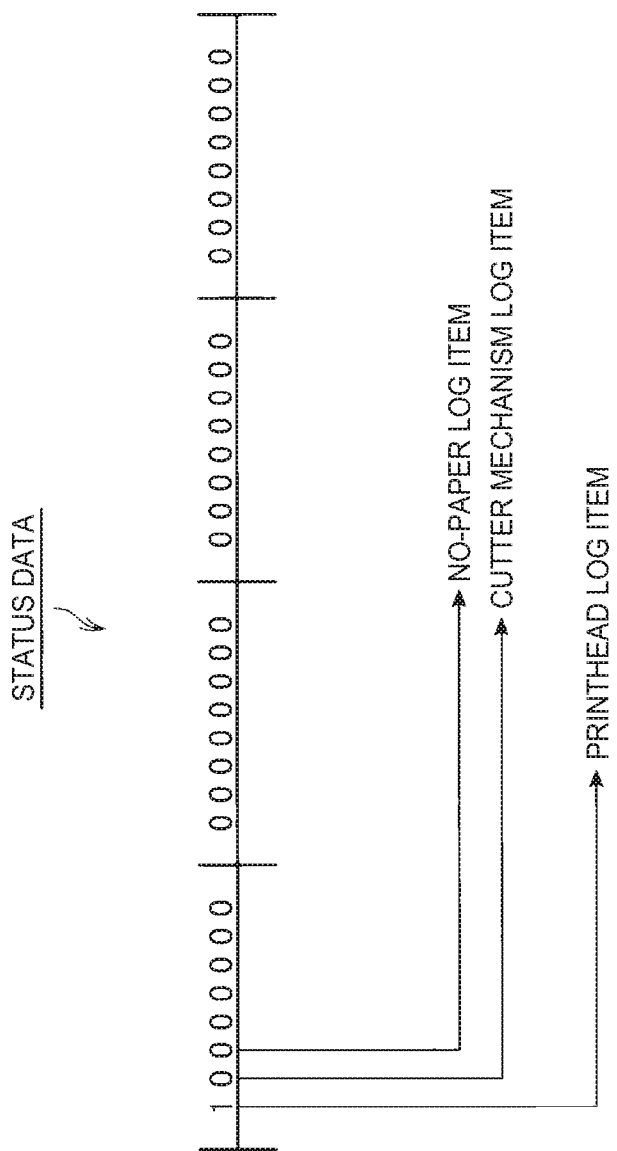
FIG. 9 shows an example of status data.

FIG. 9 shows an example of status data.

The status data is four bytes long. Each bit in the status data functions as a flag for a particular log item. In the example in FIG. 9, bit 1 is the printhead log item flag, bit 2 is the cutter mechanism log item flag, and bit 3 is the no-paper log item flag.

To generate the status data, the printing controller 401 acquires the current status of each log item by a specific means, and sets the flag corresponding to each log item appropriately to the status of that log item.

After generating the status data, the printing controller 401 transmits the generated status data.

In this way, when there is a change in the status of any log item, the automatic status transmission function of the printer 9 automatically generates and transmits status data.

The automatic status transmission function can be turned on or off (enabled/disabled), and when the automatic status transmission function is turned off (disabled), the printer 9 does not generate and transmit status data based on change in the status of a log item.

When the POS application AP does not have a function for executing a process corresponding to the automatic status transmission function of the printer 9, the following problems may occur.

Specifically, the automatic status transmission function of the printer 9 cannot be enabled (turned on) from the control device 8 side, and the printer 9 and control device 8 must be used for business after manually disabling the automatic status transmission function of the printer 9.

A function for executing a process corresponding to the automatic status transmission function of the printer 9 and a function for enabling the automatic status transmission function of the printer 9 can be added to the control device 8 by modifying the POS application AP. However, modifying the POS application AP is difficult, and modification of the POS application AP may affect other existing processes of the control device 8.

The control device 8 is therefore configured identically to the first embodiment as shown in FIG. 5, and executes the following process (control method of a network system 1 (printing system 1)).

Note that as described below the POS application AP in this embodiment does not have a function for executing a process corresponding to the automatic status transmission function of the printer 9.

Figure 10:
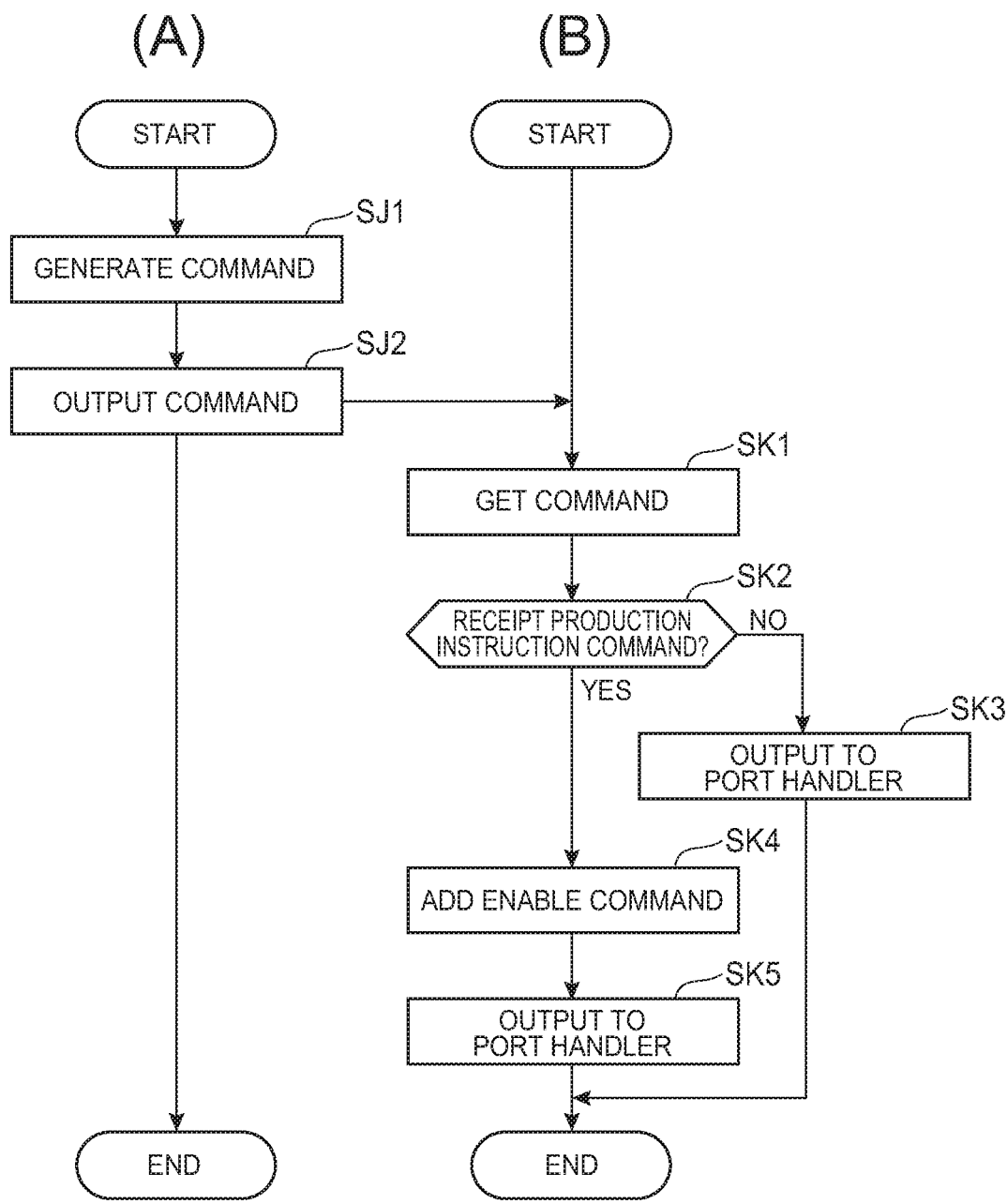
FIG. 10 is a flow chart of the operation of the control device.

FIG. 10 is a flow chart of the operation of the control device 8 when enabling the automatic status transmission function of the printer 9. FIG. 10 (A) shows the operation of the POS application execution unit 301, and (B) shows the operation of the maintenance execution unit 302.

The automatic status transmission function of the printer 9 is off (disabled) when the flow chart in FIG. 10 starts.

The control device 8 executes the process shown in the flowchart of FIG. 10 when triggered by a user instruction to enable the automatic status transmission function of the printer 9, for example.

As will be understood from FIG. 10, the control device 8 sends an enable command (described below) to the printer 9 to enable the automatic status transmission function of the printer 9 when sending a command to produce a receipt to the printer 9.

As shown in FIG. 10 (A), when a transaction is performed at the checkout counter, the POS application execution unit 301 executes the transaction process and generates a command instructing producing a receipt (step SJ1) as described with reference to the flow chart in FIG. 3 (A).

Note that the POS application AP in this embodiment of the disclosure also has the function of a printer driver, and the POS application execution unit 301 generates commands. However, a printer driver separate from the POS application AP may be installed to the control device 8, and the POS application AP and printer driver may work together to generate commands.

The POS application execution unit 301 outputs the generated commands to the virtual port KP (step SJ2).

The command (receipt production instruction command in this example, see FIG. 7) output to the virtual port KP is output by a function of the port handler PH to the maintenance execution unit 302.

As shown in FIG. 10 (B), the maintenance execution unit 302 acquires the command the POS application execution unit 301 output (step SK1).

Next, the maintenance execution unit 302 determines if the command acquired in step SK1 is a receipt production instruction command (step SK2).

As shown in FIG. 10 (B), in step SK2 the maintenance execution unit 302 interprets the command acquired in step SK1, and determines if the command is a receipt production instruction command. The maintenance execution unit 302 can determine if the command acquired in step SK1 is a receipt production instruction command by determining if a print instruction command for printing a specific string that is always printed on a receipt (for example, whether or not the string TOTAL is contained if the string TOTAL is printed on every receipt) is contained in the set of commands in the receipt production instruction command. The process of step SK2 may be executed using any appropriate method.

If the command acquired in step SK1 is not a receipt production instruction command (step SK2: NO), the maintenance execution unit 302 outputs the command to the port handler PH (step SK3). The command output to the port handler PH is transmitted through the LAN port LP to the printer 9 by a function of the port handler PH.

If the command acquired in step SK1 is a receipt production instruction command (step SK2: YES), the maintenance execution unit 302 adds an enable command after the cut instruction command (step SK4).

As described above, the enable command is a command instructing turning on (enabling) the automatic status transmission function.

Next, the maintenance execution unit 302 outputs a receipt production instruction command to which the enable command was added (referred to below as an "modified command with an added Enable setting") to the port handler PH (step SK5). The command output to the port handler PH is transmitted by a function of the port handler PH to the printer 9 through the LAN port LP. The process of step SK5 is an example of a process of sending a command with an added enable command to the printer 9.

While not shown in the figures, when a modified command with an added enable setting is received, the printing controller 401 of the printer 9 produces a receipt based on the receipt production instruction command contained in the modified command with an added enable setting. Based on the enable command contained in the modified command with an added enable setting, the printing controller 401 also enables the automatic status transmission function.

The effect of the control device 8 executing the process shown in FIG. 10 to enable the automatic status transmission function of the printer 9 is described below.

Specifically, there is no need to instantiate another communication path (such as a TCP connection between the maintenance execution unit 302 and printing controller 401 through the local area network LN) for the maintenance execution unit 302 to send an enable command to the printer 9. The maintenance execution unit 302 can send an enable command using the communication path the POS application execution unit 301 uses to exchange data with the printing controller 401 of the printer 9 without instantiating a new communication connection. This is particularly effective when there is only one logical port (such as a TCP port) that can be used for communication with the printing controller 401. This is because when a communication connection is opened with the printing controller 401 of the printer 9, the POS application execution unit 301 can use that communication connect to send an enable command without closing the communication connection already open.

Because an enable command is sent from the control device 8 to the printer 9 by executing the process shown in FIG. 10, the automatic status transmission function of the printer 9 can be turned on without modifying the POS application AP.

More specifically, as described in FIG. 10, the command (receipt production instruction command) the POS application execution unit 301 outputs is not changed in any way to transmit an enable command. This is because the enable command is added by a function of the maintenance execution unit 302 without affecting the process of the POS application execution unit 301. In other words, there is no need to change the content of commands output by the POS application execution unit 301 to transmit an enable command, and modifying the POS application AP is therefore not necessary.

For the same reasons described in the first embodiment with reference to FIG. 6, the enable command is added after the cut instruction command, and the command to which an enable command is added is output as the receipt production instruction command.

Figure 11:
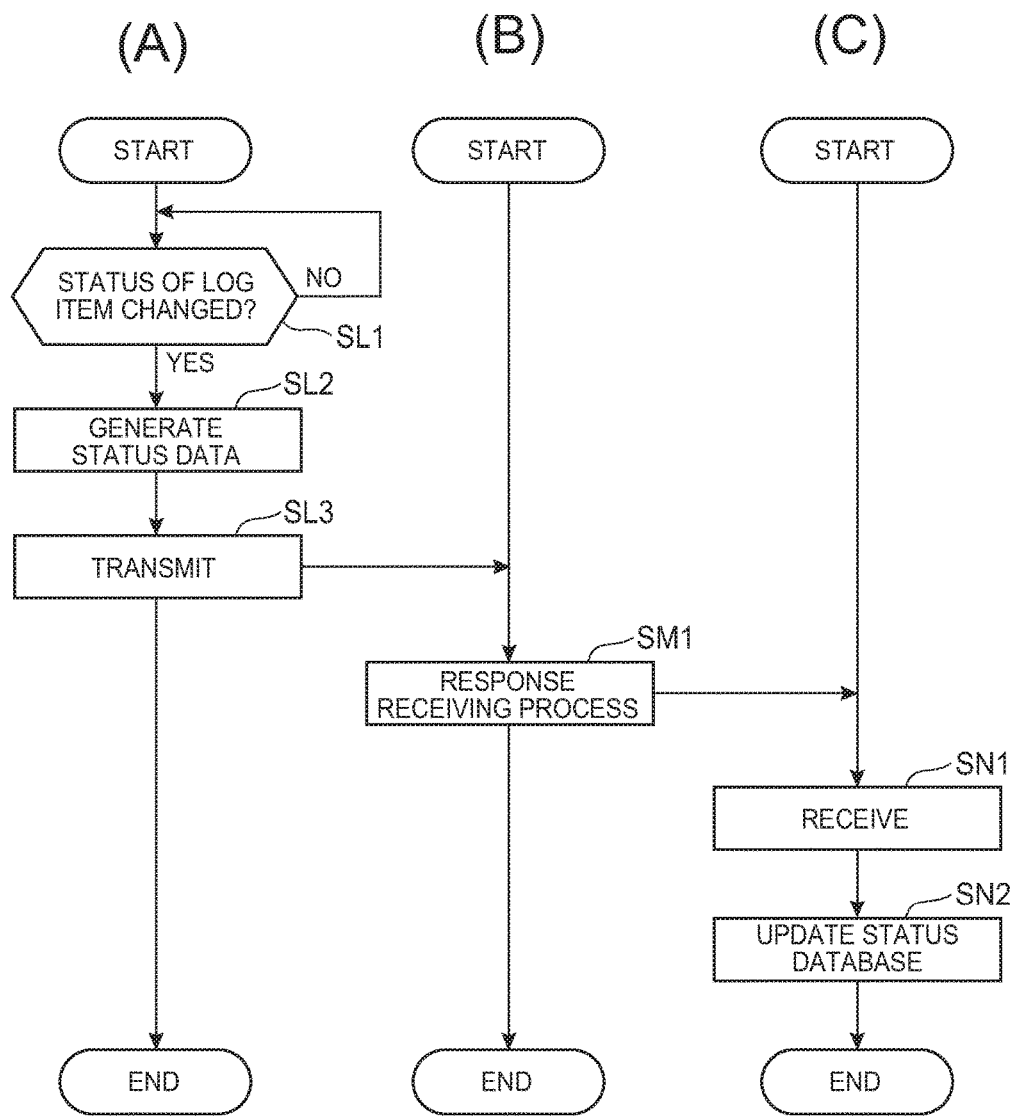
FIG. 11 is a flow chart of the operation of the printing device, control device, and maintenance server.

FIG. 11 is a flow chart of the operation of the printer 9, control device 8, and maintenance server 7, (A) showing the operation of the printer 9, (B) showing the operation of the control device 8, and (C) showing the operation of the maintenance server 7.

Note that in FIG. 11 the automatic status transmission function of the printer 9 is enabled.

As shown in FIG. 11 (A), the printing controller 401 of the printer 9 monitors for a change in the status of any log item (step SL1).

If the status of any log item changes, the printing controller 401 generates status data as described above (step SL2), and sends the status data to the control device 8 (step SL3).

As shown in FIG. 11 (B), the control device controller 30 of the control device 8 executes a response receiving process to receive the data transmitted by the printer 9 (step SM1).

The response receiving process of step SM1 is described below.

Figure 12:
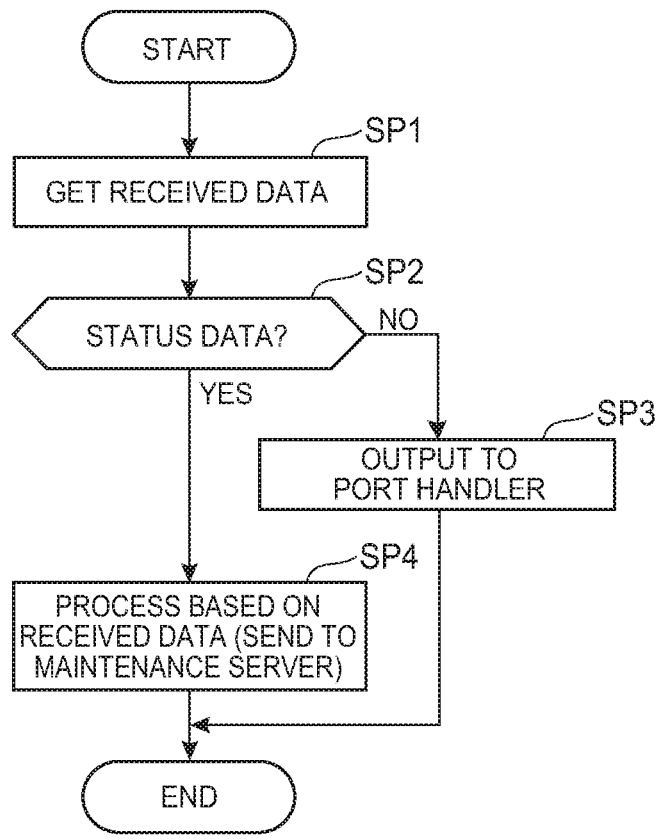
FIG. 12 is a flow chart of the operation of the control device.

FIG. 12 is a flow chart of the operation of the maintenance execution unit 302 when executing the response receiving process of FIG. 11 (B).

As shown in FIG. 12, the maintenance execution unit 302 acquires the received data output by the port handler PH (the data the control device 8 received from the printer 9) (step SP1).

Next, the maintenance execution unit 302 analyzes the received data acquired in step SP1, and determines if the received data is status data (step SP2).

The data format of the status data is defined, and the maintenance execution unit 302 makes the decision in step SP2 based on the format of the received data. Note that any appropriate method may be used to detect status data in step SP2.

When the received data acquired in step SP1 is not status data (step SP2: NO), the maintenance execution unit 302 outputs the received data to the port handler PH (step SP3). The received data input to the port handler PH is then output by a function of the port handler PH to the POS application execution unit 301.

The process of step SP3 is an example of a process that outputs the received data to the POS application execution unit 301 (control unit) when the received data is not status data.

The maintenance execution unit 302 thus outputs the received data to the POS application execution unit 301 when the received data is not status data. This is because in this case the received data is data that the printer 9 transmitted for processing by the POS application execution unit 301.

If the received data acquired in step SP1 is status data (step SP2: YES), the maintenance execution unit 302 executes a process based on the received data (=status data) without outputting the received data to the port handler PH (step SP4). More specifically, the maintenance execution unit 302 adds printer identification information identifying the printer 9 that sent the status data to the received status data, and sends the status data and printer identification information to the maintenance server 7.

Below, the status data to which printer identification information is added is referred to below as printer status information data.

The process of step SP4 is an example of executing a process based on received data without outputting the received data to the POS application execution unit 301 (control unit) when the received data is status data.

As a result, when the received data is status data, the maintenance execution unit 302 executes a process based on the received data instead of outputting the received data to the POS application execution unit 301. As a result, unexpected data being input to the POS application execution unit 301 and affecting processing by the POS application execution unit 301 can be prevented.

Note that the flow chart shown in FIG. 11 assumes that the received data is status data.

As shown in FIG. 11 (C), the maintenance server 7 receives the printer status information data (including printer identification information and status data) transmitted by the control device 8 (step SN1).

Next, the maintenance server 7 updates the status database (not shown in the figure) based on the printer status information data that was received (step SN2).

The status database is a database for storing printer identification information identifying the printer 9 and status data for each printer 9 in the store system 3.

Based on the printer status information data that was received, in step SN2 the maintenance server 7 updates the status data stored in the status database.

As described above, for each printer 9 in the store system 3, the status database stores printer identification information identifying a specific printer 9 and the most recent status data for each printer 9.

When queried about the status of a particular printer 9, the maintenance server 7 references the status database and acquires the status data for that specific printer 9. Next, the maintenance server 7 returns information related to the state of the specific printer 9 based on the acquired status data.

As described above, a store system 3 included in a network system 1 according to this embodiment of the disclosure comprises a printer 9 that prints to roll paper (recording media), and a control device 8 that can communicate with the printer 9. The printer 9 has an automatic status transmission function for monitoring the status of log items, and transmitting status data including information related to the log item of which the status changed when the status of a log item changes, and this automatic status transmission function can be turned on (enabled) or off (disabled).

The control device 8 has a POS application execution unit 301 (control unit) that generates and outputs commands instructing printing to the printer 9 according to a POS application AP (printing program). The control device 8 also has a maintenance execution unit 302 (management unit) that adds to the command output by the POS application execution unit 301 an enable command turning the automatic status transmission function of the printer 9 on, and sends the modified command with the added enable command to the printer 9, by means of a maintenance program MG that is different from the POS application AP.

Thus comprised, the maintenance execution unit 302 based on functions of the maintenance program MG can enable the automatic status transmission function of the printer 9 by adding and transmitting an enable command with the command output by the POS application execution unit 301. As a result, the control device 8 can turn the automatic status transmission function of the printer 9 on by a maintenance execution unit 302 based on functions of the maintenance program MG without modifying the POS application AP.

Note that a program equivalent to a printing program is not limited to a POS application AP. For example, the program may be a combination of the POS application AP and a printer driver, or another program. In other words, the printing program may be any program different from the maintenance program MG.

In this embodiment of the disclosure the maintenance execution unit 302 of the control device 8 acquires and interprets data received from the printer 9, and determines if the received data is status data. If the received data is not status data, the maintenance execution unit 302 outputs the received data to the POS application execution unit 301; if the received data is status data, the maintenance execution unit 302 executes a process based on the received data instead of outputting the received data to the POS application execution unit 301.

Thus comprised, the maintenance execution unit 302 can output data received from the printer 9 that should be processed by the POS application execution unit 301 to the POS application execution unit 301, and the data can be processed by the POS application execution unit 301. The maintenance execution unit 302 also executes a process based on status data received from the printer 9 for processing by the maintenance execution unit 302 instead of outputting the status data to the POS application execution unit 301.

The command output by the POS application execution unit 301 in this embodiment of the disclosure is a command set instructing the printer 9 to produce a receipt (ticket), and includes print instruction commands instructing printing images on roll paper, and a cut instruction command instructing cutting the roll paper at the end of the command set (after the end of the print instruction commands). When an enable command is added to the command, the maintenance execution unit 302 adds the enable command after the cut instruction command at the end of the command set.

By inserting the enable command after the cut instruction command, this configuration can prevent the enable command from being inserted between one command and another command in the receipt production instruction commands, and can prevent a receipt from not being produced normally.

The first and second embodiments of the disclosure described above are examples only, and can be modified and adapted in many ways without departing from the scope of the accompanying claims.

For example, the disclosure is described above using the store system 3 deployed in a store, but the facility in which the store system 3 is deployed is not limited to stores.

Communication between devices in the network system 1 may also be by any desirable means.

The printer 9 in the foregoing embodiment is described using a thermal recording method, but the recording method is not so limited.

Function blocks in the foregoing embodiments may also be configured as desired by the cooperation of hardware and software, and do not suggest a specific hardware configuration.

A CPU (including a processor) can achieve the described units by executing a program in a memory or a storage. A circuit (including an ASIC or a FPGA) can achieve the described units. The combination of any of these can achieve the described units. Each controller executes processes by the cooperation of hardware and software.

What is claimed is:

1. A printing system comprising:
    a printing device that prints on recording media; and
    a control device configured to communicate with the printing device, the control device comprising:
        a controller configured to generate and output, by a printing program, a print command instructing the printing device to print, and
        a manager configured to generate a maintenance command related to a status of the printing device, and send the maintenance command to the printing device, by a maintenance program that is different from the printing program,
    wherein the maintenance command comprises an enable or disable command that sets an automatic status transmission function of the printing device to either an enabled state or a disabled state,
    the maintenance command further comprises a request command that requests the printing device to return status information related to the printing device, and
    the manager of the control device is configured to (i) determine if received data received from the printing device is the status information, (ii) output the received data to the controller when the received data is not the status information, and (iii) when the received data is the status information, execute a process based on the status information and not output the status information to the controller.

2. The printing system described in claim 1, wherein:
    the printing device comprises a cutter configured to cut the recording media; and
    the print command is a command set comprising:
        a print instruction command instructing printing an image to the recording media, and
        a cut instruction command instructing cutting the recording media by the cutter after the print instruction command.

3. The printing system described in claim 1, wherein the automatic status transmission function comprises monitoring the status of specific log items related to the printing device, and when there is a change in the status of any log item, transmitting status information related to the log item of which the status changed without being requested by the control device.

4. A control device capable of communicating with a printing device that prints on recording media, the control device comprising:
    a controller configured to generate and output, by a printing program, a print command instructing the printing device to print; and
    a manager of the control device configured to generate a maintenance command related to a status of the printing device, and send the maintenance command to the printing device, by a maintenance program that is different from the printing program,
    wherein the maintenance command comprises an enable or disable command that sets an automatic status transmission function of the printing device to either an enabled state or a disabled state, and
    wherein the manager of the control device is configured to (i) determine if received data received from the printing device is the status information, (ii) output the received data to the controller when the received data is not the status information, and (iii) when the received data is the status information, execute a process based on the status information and not output the status information to the controller.

5. The control device described in claim 4, wherein:
    the printing device comprises a cutter configured to cut the recording media; and
    the print command is a command set comprising:

a print instruction command instructing printing an image to the recording media, and a cut instruction command instructing cutting the recording media by the cutter after the print instruction command.

6. The control device described in claim 4, wherein the maintenance command further comprises a request command that requests the printing device to return status information related to the printing device.

7. The control device described in claim 4, wherein the automatic status transmission function comprises monitoring the status of specific log items related to the printing device, and transmitting status information related to the log item of which the status changed without being requested by the control device when there is a change in the status of any log item.

8. A control device capable of communicating with a printing device that prints on recording media, the control device comprising:

a controller configured to generate and output, by a printing program, a print command instructing the printing device to print; and a manager configured to generate a maintenance command related to a status of the printing device, and send the maintenance command to the printing device, by a maintenance program that is different from the printing program, wherein the maintenance command comprises an enable or disable command that sets an automatic status transmission function of the printing device to either an enabled state or a disabled state, the automatic status transmission function comprises monitoring the status of specific log items related to the printing device, and when there is a change in the status of any log item, transmitting status information related to the log item of which the status changed without being requested by the control device, and the manager of the control device is configured to (i) determine if received data received from the printing device is the status information, (ii) output the received data to the controller when the received data is not the status information, and (iii) when the received data is the status information, execute a process based on the status information and not output the status information to the controller.

* * * * *